United States Patent
Ruck et al.

(10) Patent No.: US 9,624,792 B2
(45) Date of Patent: Apr. 18, 2017

(54) METHOD, HEAT ACCUMULATOR AND HEAT ACCUMULATOR SYSTEM FOR HEATING AND COOLING A WORKING FLUID

(75) Inventors: Wolfgang Ruck, Reppenstedt (DE); Oliver Opel, Lüneburg (DE)

(73) Assignee: Leuphana Universität Lüneburg, Lüneburg (DE)

( * ) Notice: Subject to any disclaimer, the term of this patent is extended or adjusted under 35 U.S.C. 154(b) by 0 days.

(21) Appl. No.: 13/579,263

(22) PCT Filed: Feb. 3, 2011

(86) PCT No.: PCT/EP2011/000479
§ 371 (c)(1),
(2), (4) Date: Oct. 2, 2012

(87) PCT Pub. No.: WO2011/098228
PCT Pub. Date: Aug. 18, 2011

(65) Prior Publication Data
US 2013/0167534 A1    Jul. 4, 2013

(30) Foreign Application Priority Data

Feb. 15, 2010  (DE) .................. 10 2010 008 111
Jun. 11, 2010  (DE) .................. 10 2010 023 416

(51) Int. Cl.
*F28D 3/02*    (2006.01)
*F01K 3/00*    (2006.01)
(Continued)

(52) U.S. Cl.
CPC ............ *F01K 3/00* (2013.01); *F01K 25/06* (2013.01); *F28D 17/00* (2013.01); *F28D 20/003* (2013.01); *Y02E 60/142* (2013.01)

(58) Field of Classification Search
USPC .......... 60/649; 165/10, 140, 104.31, 104.34; 429/408, 400, 428
See application file for complete search history.

(56) References Cited

U.S. PATENT DOCUMENTS 3,973,552 A * 8/1976 Ervin, Jr. ................ F24D 11/00
126/263.01
4,161,211 A * 7/1979 Duffy ...................... B60H 1/22
126/263.01
(Continued)

FOREIGN PATENT DOCUMENTS

DE     19811302 A1    2/1999
DE     10309584 A1    10/2003
(Continued)

OTHER PUBLICATIONS

International Search Report and Written Opinion dated Nov. 25, 2011 from International Patent Application No. PCT/EP2011/000479 filed Feb. 3, 2011 with English translation of International Search Report (10 pages).
(Continued)

*Primary Examiner* — Thomas Denion
*Assistant Examiner* — Shafiq Mian
(74) *Attorney, Agent, or Firm* — Sunstone IP

(57) ABSTRACT

The invention relates to a method for heating and cooling a working fluid (2) using at least one thermochemical heat accumulator medium (3), wherein the working fluid (2) is guided through at least one thermochemical heat accumulator (6) comprising the heat accumulator medium (3), wherein the working fluid (2) is guided without contact to the heat accumulator medium (3), wherein upon charging of the heat accumulator medium (3) a heat flow (Q) is transferred from the working fluid (2) to the heat accumulator medium (3) and at least one substance (15) is released from the heat accumulator medium (3) and discharged from the (Continued)

Figure 1:
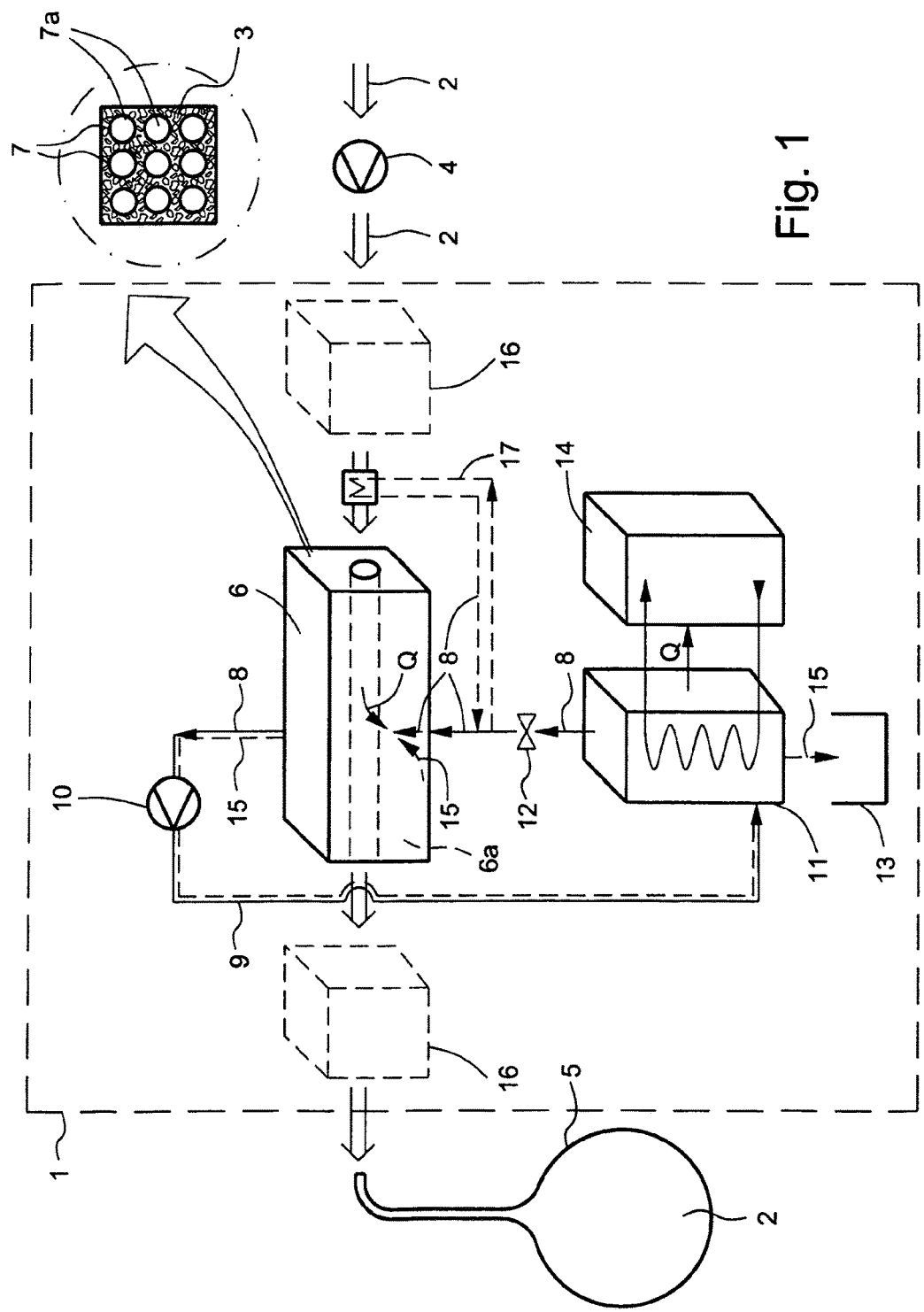

heat accumulator (6), and wherein upon discharging of the heat accumulator medium (3) the substance (15) is fed with release of heat to the heat accumulator medium (3) or at least to a reaction product of the heat accumulator medium (3) that was produced during charging of the heat accumulator medium (3), and a heat flow (Q) is transferred to the working fluid (2).

13 Claims, 2 Drawing Sheets

(51) Int. Cl.
*F28D 20/00* (2006.01)
*F01K 25/06* (2006.01)
*F28D 17/00* (2006.01)

(56) References Cited

U.S. PATENT DOCUMENTS

| | | | | |
|---|---|---|---|---|
| 4,194,964 A | * | 3/1980 | Chen | B01J 8/0453 203/28 |
| 4,713,944 A | * | 12/1987 | Januschkowetz | F25B 17/08 62/239 |
| 4,823,864 A | * | 4/1989 | Rockenfeller | F25B 17/02 165/104.12 |
| 5,142,884 A | * | 9/1992 | Scaringe et al. | 62/324.4 |
| 8,034,308 B2 | * | 10/2011 | Chiu | B01J 8/067 165/140 |
| 8,136,354 B2 | * | 3/2012 | Havel | F01K 3/00 60/412 |
| 8,246,700 B1 | * | 8/2012 | Kutsin | C10J 3/463 423/644 |
| 8,327,920 B2 | * | 12/2012 | Kudo | F24H 7/04 122/31.1 |
| 2007/0138022 A1 | * | 6/2007 | Peter | C25B 1/02 205/628 |
| 2008/0078532 A1 | * | 4/2008 | Nagashima | B22F 3/11 165/104.34 |
| 2009/0071155 A1 | * | 3/2009 | Boyapati | F01K 7/36 60/649 |
| 2011/0146939 A1 | * | 6/2011 | Bond et al. | 165/10 |

FOREIGN PATENT DOCUMENTS

| | | | | |
|---|---|---|---|---|
| EP | 1857614 A2 | | 11/2007 | |
| GB | 2081875 A | * | 2/1982 | |
| GB | 2083905 A | * | 3/1982 | F24D 11/0214 |
| JP | 05288485 A | | 2/1993 | |
| JP | 1089798 A | | 4/1998 | |
| RU | 2123157 C1 | | 12/1998 | |
| RU | 2150603 C1 | | 6/2000 | |
| RU | 2255236 C1 | | 6/2005 | |
| SU | 1816070 A1 | | 5/1996 | |

OTHER PUBLICATIONS

Office Action dated Nov. 8, 2011 from German Patent Application No. 102010023416.8 (5 pages).
English Translation of Office Action dated Nov. 8, 2011 from German Patent Application No. 102010023416.8 (5 pages).
International Preliminary Report on Patentability dated Aug. 21, 2012 from International Patent Application No. PCT/EP2011/000479 (12 pages).
Office Action dated Mar. 17, 2015 from Japanese Patent Application No. 2012-553207 filed.
Decision to Grant dated Feb. 16, 2016 for Russian Patent Application No. 2012136917/06(059829) filed Feb. 3, 2011.

* cited by examiner

METHOD, HEAT ACCUMULATOR AND HEAT ACCUMULATOR SYSTEM FOR HEATING AND COOLING A WORKING FLUID

The invention relates to a method, a heat accumulator and a heat accumulator system for heating and cooling a working fluid using at least one thermochemical heat accumulator medium.

Conventional heat accumulators use accumulator media like water, which are characterized by a high heat capacity. The "palpable" or respectively "sensitive" heat is accumulated. Higher energy densities are achieved when the accumulator medium passes through an aggregate change within the temperature spread between charging and discharging. The advantage of these latent accumulator media is the low increase in the accumulator temperature with simultaneous high heat absorption. However, in case of sensitive and latent heat accumulation, for a long-term accumulation an insulation of the accumulator is necessary.

In case of thermochemical accumulators, the accumulated heat is not palpable. Suitable reversible reactions in the low temperature range are, inter alia, sorption processes, such as the absorption or respectively adsorption of a working medium by a solid. Such a sorption accumulator is charged by a volatilizable substance, for example water, being extracted from a thermochemical accumulator medium through the supply of heat. For this purpose, e.g. a hot, dry gas flow can be fed to the accumulator medium, wherein the water expelled during the charging through desorption is received by and exits the accumulator with the hot, dry gas flow. The thus-cooled, moist gas flow is usually fed to the environment. In order to release sorption heat at a later point in time, water vapour is fed to the charged accumulator medium, wherein binding energy in the form of heat is released when water vapour is adsorbed to the sorption material.

Moreover, thermochemical accumulator materials are known, in which heat supply to the accumulator material results in the release of a substance due to a chemical reaction (charging). If this substance is later fed to the charged accumulator material, this results in the release of reaction heat due to the reverse chemical reaction (discharging). For example, thermochemical materials are known from the prior art, in which heat supply leads to a decomposition reaction and the formation of at least one decomposition product and a (volatilizable) substance. If the substance is fed to the decomposition product again later, reaction heat is released.

If the known thermochemical accumulator materials for the heating and/or cooling of a working fluid are used, with the working fluid passing through the thermochemical accumulator medium, the released substance is received by the working fluid during the charging of the heat accumulator medium, wherein problems can result from the concentrations and/or the presence of the released substance in the working fluid. If, for example, water is released during a desorption process or during a decomposition reaction and received by the working fluid, the water vapour concentration in the working fluid increases, which can lead to undesired condensation during further use of the working fluid. If the substance released during the charging is conveyed to the environment in a gas flow, this leads to a loss of heat substance, which makes it necessary to provide the substance again later for discharging the heat accumulator medium. Finally, it is disadvantageous that foreign bodies and particles can be introduced to the heat accumulator medium when the working fluid flows through the thermochemical heat accumulator, which leads to a destruction of the heat accumulator medium and/or to a decrease in the heat accumulator performance.

It is an object of the present invention to provide a method, a heat accumulator and a heat accumulator system, in which the aforementioned disadvantages do not occur. Moreover, it is an object of the present invention to provide a method, a heat accumulator and a heat accumulator system, each of the initially named type, which enable use in new areas of application in a simple manner and with high efficiency of the heat accumulation.

In a method of the initially named type, the aforementioned objects are solved in that the working fluid is fed through at least one thermochemical heat accumulator disposing of the heat accumulator medium, in that the working fluid is guided without contact to the heat accumulator medium, in that when heat accumulator medium is charged, a heat flow is transferred from the working fluid to the heat accumulator medium and at least one substance is released from the heat accumulator medium and conveyed away from the heat accumulator, and in that upon discharging of the heat accumulator medium the substance is fed, releasing heat, to the heat accumulator medium or at least to a reaction product of the heat accumulator medium produced during the charging of the heat accumulator medium and a heat flow is transferred to the working fluid.

Accordingly, the heat accumulator according to the invention has a flow-through area for a working fluid and an accumulator area having at least one heat accumulator medium, the flow-through area being separated materially from the accumulator area so that the working fluid is guided without contact to the heat accumulator medium during flow-through, and the flow-through area and the accumulator area being interconnected such that a heat transfer is possible between the working fluid and the heat accumulator medium during charging and discharging of the heat accumulator medium.

At this point, the invention is based on the basic idea of providing an indirect heat transfer between the working fluid and the thermochemical heat accumulator medium during the charging or respectively discharging of the heat accumulator medium, wherein the heat supply required during the charging leads to the cooling of the working fluid and the sorption heat or reaction heat released during the discharging of the heat accumulator medium leads to the heating of the working fluid. Because of the material separation of the working fluid from the heat accumulator medium, particularly the charging of the heat accumulator medium does not lead to the receipt of substance released from the heat accumulator medium by the working fluid, which is particularly advantageous for such working fluids in which the composition must meet certain requirements. If, for example, water is released as the (volatilizable) substance during the charging of the heat accumulator medium, the method according to the invention does not result in an increase in water vapour concentration in the working fluid. This is particularly advantageous when high water vapour charging in the working fluid can lead to disadvantages, for example due to the formation of condensation water during the further use of the working fluid. The material separation of the working fluid from the heat accumulator medium ensures that no disruptive substances and/or particles impairing the heat accumulator performance can be introduced to the heat accumulator medium. Moreover, due to the separation between the working fluid and the heat accumulator medium, different pressure levels can be set in the flow-through area for the working fluid on one hand and in the accumulator area for the heat accumulator medium on the other hand, which permits an advantageous further embodiment of the invention. This will be covered in detail below.

Another aspect of the present invention relates to the use of the method, heat accumulator and heat accumulator system according to the present invention for heating or cooling compressed air for compressed air accumulator power stations. This aspect per se disposes of inventive significance. In compressed air accumulator power plants known from the prior art, the heat generated during the charging of cavern accumulators by means of air compression is dissipated and is subsequently re-fed during the discharging through the combustion of fossil fuels (diabatic compressed air accumulation). Previous approaches for accumulating heat generated during compression and in turn needed for decompression (adiabatic compressed air accumulation) are based on the use of sensitive heat accumulation, in particular using concrete, ceramic or comparable highly temperature-resistant materials as heat accumulator medium, such as those described in EP 1 857 614 A2. Because of the characteristics of sensitive heat accumulation, high temperatures and/or large accumulator volumes are required, which can cause problems with the compressor technology and/or with the heat accumulator in connection with the high pressure level of the compressed air accumulator of up to 80 bar. Due to the use of thermochemical heat accumulators according to the invention, the quantity of the necessary heat accumulator material can be reduced, which leads to lower construction requirements for pressure resistance and to lower costs in connection with heat accumulation.

The solution according to the invention is advantageous in particular in connection with the use of heat accumulator mediums, which release water as volatilizable substance during charging, for the heating and cooling of compressed air for compressed air accumulator power plants. Due to the material separation of working fluid and heat accumulator medium, the water vapour concentration in the working fluid remains constant during the charging of the heat accumulator medium, the water released during charging being conveyed out of the accumulator area of the heat accumulator for example via another gas flow or in another manner. Generally, released water vapour could also for example be removed from the accumulator area by suction. If a thermochemical heat accumulator system is used instead, in which the working fluid receives the volatilizable substance (water), this will lead to (increased) condensation of gaseous water on the accumulator walls and in the accumulator (cavern), condensation heat being pulled out of the energy accumulator circulation, which reduces the efficiency of the heat accumulation. Furthermore, the water accumulating on the walls leads to an uncontrollable dissolution process, which is equal to an undercasting. The residual water in the sump increases continuously and requires regular pumping.

In a preferred embodiment of the method according to the invention, it is provided that the substance discharged during the charging of the heat accumulator medium and conveyed out of the heat accumulator is accumulated and removed from an accumulator for the discharging of the heat accumulator medium and recycled to the heat accumulator. The provision and supply of the substance for the discharging of the heat accumulator medium from outside is thus generally not needed, but can be provided to compensate for substance losses, which can occur in the heat accumulator system.

In order to be able to convey the substance released during the charging of the heat accumulator medium out of the heat accumulator and/or to (re)feed the substance for the discharging of the heat accumulator medium to the heat accumulator, an auxiliary fluid, in particular a gas flow, more particularly an air flow, can be used, the auxiliary fluid passing through the heat accumulator and at the same time being brought in contact with the heat accumulator medium and/or with the reaction product of the heat accumulator medium, which is formed during the charging of the heat accumulator medium. The removal and the supply of the substance from or respectively to the accumulator area of the heat accumulator are thereby simplified. In this is context, it is furthermore advantageous to feed the auxiliary fluid in a cycle that is materially separated from the flow path of the working fluid and preferably closed. Due to the material separation between the auxiliary fluid and the working fluid, the transition of the released substance into the working fluid can be safely excluded. By means of a closed cycle, it is possible to recycle the substance, wherein the substance transported through the auxiliary fluid during the charging of the heat accumulator medium is first separated from the auxiliary fluid and can be accumulated for use during the discharging of the heat accumulator medium. In connection with the discharging of the heat accumulator medium, the substance is then removed from the substance accumulator and added to the auxiliary fluid, which serves to transport the substance to the heat accumulator medium or respectively to a reaction product of the heat accumulator medium formed during charging.

It is to be understood that the auxiliary fluid preferably does not react with the released substance, which simplifies the separation of the substance.

The substance released during the charging of the heat accumulator medium can be separated from the auxiliary fluid through phase conversion, wherein, preferably, the energy released during the phase conversion is accumulated at least partially and can be used for a new phase conversion of the substance for use of the substance during the discharging of the heat accumulator medium. If water or respectively water vapour of the heat accumulator medium is released during charging as (volatilizable) substance, it can easily be precipitated out of the auxiliary fluid through condensation. In doing so, the condensation heat can be accumulated in another heat accumulator, wherein for example a latent heat accumulator, another thermochemical accumulator or even a sensitive heat accumulator can be provided. For discharging the heat accumulator medium, the condensed water is then evaporated and then returned to the auxiliary fluid, the accumulated condensation heat being used for the evaporation. Heat loss through discharge of the water vapour to the environment can be excluded due to the transport of the vaporous water between the heat evaporator and the condenser or respectively phase converter of the heat accumulator system in a closed cycle.

The released substance is fed together with the auxiliary fluid preferably in a closed cycle. However, the invention permits the addition of the substance in the necessary amount to the (closed) cycle of the auxiliary fluid for the balancing of substance losses.

The recirculation of the auxiliary fluid is particularly advantageous when the method according to the invention and the heat accumulator are used for the heating or cooling of compressed air of compressed air accumulator power plants. If, in contrast to the solution according to the invention, released water vapour is received from the working fluid during the charging of the heat accumulator medium, the air humidity of the accumulated air after condensation of water in the cavern accumulator during the discharging is generally no longer sufficient for releasing the accumulated heat output (completely). As a result, water vapour should be added to the accumulated air before entry into the heat accumulator for discharging the heat accumulator medium. The water vapour must be produced through the use of heat energy, which impairs the efficiency of the heat accumulation. Moreover, the injection of water through injectors into the heat accumulator can destroy the heat accumulator medium. These disadvantages do not occur in the case of the circulation provided according to the invention, a sufficient amount of volatilizable substance circulating in the auxiliary fluid cycle or, respectively, being removed from an accumulator in the cycle for a discharging of the heat accumulator medium and being re-fed to the auxiliary fluid before entry into the heat accumulator.

The term "thermochemical heat accumulator medium" refers to those heat accumulator materials in which heat supply based on a desorption process and/or at least one chemical reaction, in particular a decomposition reaction, leads to the release of water and/or at least one substance. The endothermal expelling of the substance through a desorption process and/or a chemical reaction is to be understood as "charging of the heat accumulator medium" in terms of the invention. For discharging the heat accumulator medium or respectively for releasing the sorption heat and/or reaction heat, it is required that the volatilized or respectively separated substance is re-fed to the sorption substance or respectively to the reaction product formed during the chemical reaction. Sorption substances can be selected from the group of zeolites and/or silica gels. Moreover, such heat accumulator media can be used, in which heat release results during charging due to decomposition reactions, for example the decomposition of metal hydroxides, in particular calcium hydroxide and/or magnesium hydroxide, as well as through decomposition of metal hydrides, in particular magnesium hydride. Moreover, further chemical reactions are possible and known to a person skilled in the art, which release a substance when heat energy is supplied (charging) and create sorption and/or reaction heat during the later discharging when the substance is supplied.

In particular, in connection with the invention, such heat accumulator media should be used, in which water is released based on a desorption or respectively as a reaction product in particular based on a decomposition reaction during the charging of the heat accumulator medium. In connection with the invention, it has been shown in particular that a mixture of different heat accumulator media can be advantageous. In this connection, use of a mixed accumulator, in which zeolite is used as carrier material for magnesium oxide, is possible. It is to be understood that the aforementioned list is not comprehensive. In particular, other heat accumulator media, in which release of sorption heat occurs during discharging, can be used together with such heat accumulator media, which release reaction heat during discharging.

In a further preferred embodiment of the invention, reducing the pressure level in the heat accumulator or respectively in the accumulator area for the heat accumulator medium during the charging can be provided in order to support the expelling of the volatilizable substance during the charging of the heat accumulator medium. Desorption processes can thereby be facilitated during charging of the heat accumulator medium. The same applies when there is a decomposition reaction during charging of the heat accumulator medium. In this connection, particularly reducing the pressure level in the area of the heat accumulator medium during the charging of the heat accumulator medium with respect to the ambient pressure is provided. Furthermore, increasing the pressure level during the discharging of the heat accumulator medium can be provided in order to support the running processes or reactions, respectively.

Preferably, such heat accumulator media are used, which release water as a volatilizable substance during charging through desorption or a decomposition reaction, which in particular facilitates the precipitation of the volatilizable substance out of an auxiliary fluid. Here, the volatilizable substance can be separated from the auxiliary fluid through condensation and re-fed to the auxiliary fluid through evaporation. In order to promote condensing, condensation can take place at a pressure level of the auxiliary fluid which is increased with respect to the pressure level in the heat accumulator (or respectively in the accumulator area for the heat accumulator medium), and evaporation can take place at a pressure level which is reduced with respect to the pressure level in the heat accumulator.

In a particularly simple embodiment of the method according to the invention, it can be provided that the flow direction of the auxiliary fluid is inverted during the switch between the charging and discharging of the heat accumulator medium. Different pressure levels can thereby be set with little technical effort in the accumulator area of the heat accumulator for the heat accumulator medium on one hand and in a condenser/evaporator located downstream from the heat accumulator as a phase converter on the other hand.

In order to ensure stronger cooling of the working fluid during the charging of the heat accumulator medium, a pre- or post-cooling of the working fluid can be provided before or respectively after flowing through the thermochemical heat accumulator. Accordingly, a pre- or post-heating of the working fluid can be provided in order to further raise the temperature level of the working fluid during the discharging of the heat accumulator medium. For this purpose, at least one further heat accumulator or respectively heat exchanger, preferably a latent heat accumulator or a sensitive heat accumulator, can be located upstream or downstream from the thermochemical heat accumulator. It is to be understood that the upstream or downstream heat accumulator or heat exchanger work at a different temperature level than the thermochemical heat accumulator.

Figure 2:
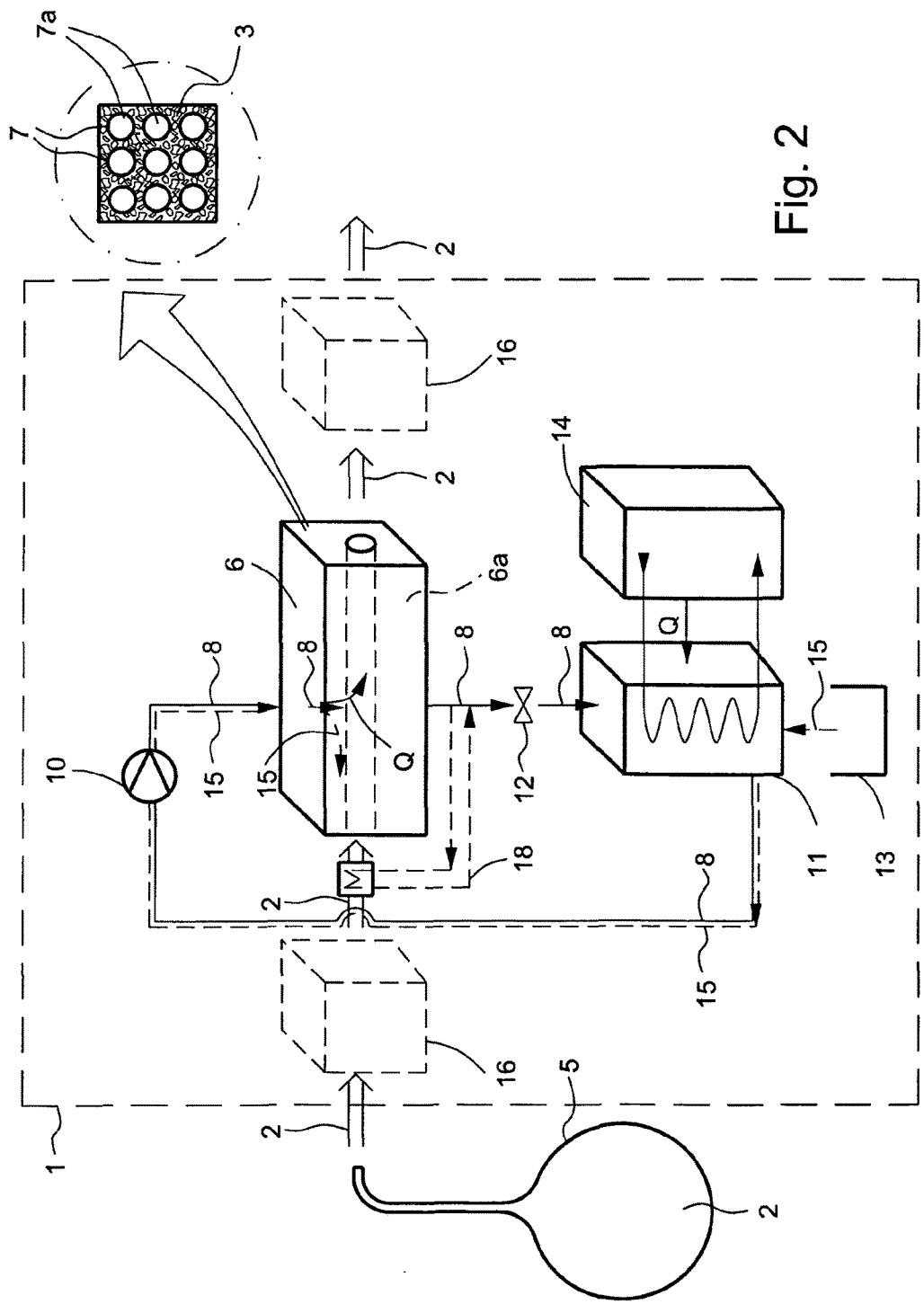

The aforementioned aspects and characteristics of the present invention and the aspects and characteristics of the present invention described below based on the drawing can be realized independently of each other, in any combination, but also respectively in connection with the preamble characteristics of at least one main claim of the present invention, even if this is not described individually. Here, inventive significance per se should be attributed to each described characteristic or aspect. Any combination of the characteristics of the dependent claims with the preamble characteristics of at least one main claim is also possible, even if it is not expressly mentioned. Further advantages, characteristics, properties and aspects of the present invention can be taken from the following description of a preferred embodiment based on the drawing. There is shown in:

FIG. 1 a schematic representation of a heat accumulator system according to the invention with a thermochemical heat accumulator during the charging of a thermochemical heat accumulator medium, and FIG. 2 the heat accumulator system shown in FIG. 1 during the discharging of the heat accumulator medium.

FIGS. 1 and 2 show a heat accumulator system 1 for heating and cooling a working fluid 2 using at least one thermochemical heat accumulator medium 3. The working fluid 2 is air, which is compressed with a compressor 4 and accumulated in a cavern 5 as compressed air. The compressed air is used for energy accumulation in a compressed air accumulator power plant (not shown in detail here). It is to be understood that the below embodiments for the structure and for the mode of operation of the heat accumulator system 1 are not restricted to the cooling or heating of compressed air for the accumulation of energy in compressed air accumulator power plants.

In the embodiment shown, the heat accumulator system 1 is provided in order to cool the working fluid 2 heated through compression before the accumulation in the cavern 5, wherein the heat energy Q to thereby be dissipated is to be accumulated in a heat accumulator 6. The heat accumulator 6 has a register made of flow tubes 7 for working fluid 2, which form a flow-through area 7a for working fluid 2. The flow tubes 7 are embedded in a thermochemical heat accumulator medium 3 as the actual accumulator material, the heat accumulator medium 3 being arranged in an accumulator area 6a of the heat accumulator 6. A mixture of zeolite and magnesium oxide can be used as heat accumulator medium 3. It is to be understood that, generally, other thermochemical heat accumulator media can also be used.

The flow-through area 7a of the heat accumulator 6 is materially separate from accumulator area 6a so that a mixing of working fluid 2 with heat accumulator medium 3 is not possible. Moreover, flow-through area 7a and accumulator area 6a are interconnected such that a heat transfer between the working fluid 2 and the heat accumulator medium 3 during charging and discharging of the heat accumulator medium 3 is possible. In this context, heat accumulator 6 has an accumulator area 6a in which the heat accumulator medium 3 is received. Accumulator area 6a has a supply line (not shown) and a drain line for an auxiliary fluid 8, the auxiliary fluid 8 being able to flow through accumulator area 6a. The auxiliary fluid 8 is fed through the heat accumulator medium 3 or respectively along the heat accumulator medium 3 so that working fluid 2 is guided without contact to heat accumulator medium 3 while passing through heat accumulator 6 and auxiliary fluid 8 contacts heat accumulator medium 3 while passing through heat accumulator 6. Heat accumulator system 1 is thus designed for indirect heat transfer between auxiliary fluid 8 and working fluid 2.

Auxiliary fluid 8 is conveyed in a closed cycle 9. In the cycle 9, auxiliary fluid 8 initially flows through the flow paths through the heat accumulator medium 3 of the heat accumulator 6 and is then conveyed via a compressor 10 to a phase converter 11 via a corresponding line. A pressure reducer 12 is provided in a line between the phase converter 11 and the heat evaporator 12. Moreover, the heat accumulator system 1 has a water reservoir 13 or respectively an accumulator reservoir for condensation water. Finally, another heat accumulator 14 is provided, which can be designed as a latent heat accumulator or also as a thermochemical or sensitive heat accumulator. With heat accumulator 6, compressor 10, phase converter 11 and water reservoir 13 as well as pressure reducer 12, cycle 9 forms a closed system for auxiliary fluid 8. A substance exchange between auxiliary fluid 8 and working fluid 2 is not provided. Moreover, substance exchange between the auxiliary fluid 8 and the environment is preferably not provided either. However, the supply of water from the environment or an external accumulator, respectively, into the cycle 9 can generally be provided in order to compensate for water losses.

The mode of operation of the shown heat accumulator system 1 is explained below. Working fluid 2 and auxiliary fluid 8 simultaneously flow through heat accumulator 6. Due to the temperature difference between working fluid 2 heated through compression and auxiliary fluid 8, a heat flow Q is transferred from working fluid 2 to heat accumulator medium 3 via the flow tubes 7. This leads to the charging of heat accumulator medium 3, which is shown in FIG. 1. During the charging of heat accumulator medium 3, the heat of working fluid 2 is used for endothermal discharging at least one volatilizable substance 15 out of heat accumulator medium 3, and, at the same time, volatilizable substance 15 is received by auxiliary fluid 8 flowing through heat accumulator medium 3 and transported out of the heat accumulator 6 with auxiliary fluid 8. This is shown schematically in FIG. 1. In the shown exemplary embodiment, the volatilizable substance 15 is water.

During charging, the pressure level in accumulator area 6a above the heat accumulator medium 3 is reduced, auxiliary fluid 8 together with volatilizable substance 15 being removed from heat accumulator 6 by suction with compressor 10. The change in the water vapour partial pressure in heat accumulator 6 on the side of heat accumulator medium 3 leads to the fast evaporation of volatilizable substance 15. Together with vaporous substance 15, auxiliary fluid 8 is conveyed via compressor 10 to phase converter 11, which works in condenser mode. The pressure level of auxiliary fluid 8 is simultaneously increased in phase converter 11 due to the suction of compressor 10. This also leads to a temperature increase of auxiliary fluid 8 transporting substance 15. In condenser 11, substance 15 is then separated from auxiliary fluid 8 by condensation, the condensation taking place at an increased pressure level of auxiliary fluid 8 with respect to the pressure level in heat accumulator 6 on the side of heat accumulator medium 3. The water released during condensation is accumulated in water reservoir 13. The heat quantity Q released during the cooling of auxiliary fluid 8 in phase converter 11 is accumulated in heat accumulator 14.

As a result, auxiliary fluid 8 exits heat accumulator 6 at a high temperature level and is water vapour saturated. The subsequent compression leads to further energy input into the auxiliary fluid, resulting in a further temperature increase. Auxiliary fluid 8 exits phase converter 11 in a cooled state and has a low water vapour content.

Pressure reducer valve 12 leads to a devolatilization of auxiliary fluid 8 and thus to a further temperature reduction before auxiliary fluid 8 returns into heat accumulator 6. Due to the supply to heat accumulator medium 3, auxiliary fluid 8 is then available for reabsorption of volatilizable substance 15.

In order to further lower the temperature of working fluid 2 which is to be cooled, at least one further heat accumulator 16 can be placed upstream or downstream from heat accumulator 6. This accumulator 16 then works at another temperature level than heat accumulator 6, which embodies the main heat accumulator. The additional heat accumulator 16 can preferably be designed as a latent heat accumulator or as a sensitive heat accumulator. Moreover, it is generally also possible to design the additional heat accumulator 16 as a thermochemical heat accumulator, wherein a different heat accumulator medium than in heat accumulator 6 can be used.

Moreover, it is possible to use dry, cooled auxiliary gas 8 for precooling working fluid 2, which is shown schematically in FIG. 1 by the dashed line 17.

Now, FIG. 2 schematically shows the discharging of heat accumulator medium 3. Working fluid 2 to be devolatilized and heated is conveyed out of cavern 5 through flow tube 7 of heat accumulator 6. Compressor 10 works in pressure mode, a partial pressure change taking place in phase converter 11 on one hand and in heat accumulator 6 on the other hand. Together with the pressure reduction in phase converter 11, condensation energy Q accumulated in heat accumulator 14 leads to the evaporation of the water removed from water reservoir 13 as a volatilizable substance 15. The generated water vapour is compressed with auxiliary fluid 8 by compressor 10 and fed under pressure to heat accumulator medium 3. Transferring heat to working fluid 2, volatilizable substance 15 is exothermally combined with heat accumulator medium 3. When heat accumulator medium 3 is discharged, sorption processes and the formation of magnesium hydroxide thus result in the release of sorption heat and reaction heat, which are transferred to working fluid 2. The transfer of the heat flow Q leads to a temperature increase in working fluid 2 while flowing through heat accumulator 6.

After separation of volatilizable substance 15 from auxiliary gas 8, the latter, in a dry and hot or warm state, reaches pressure reducer 12, is devolatilized and thereby cools down. In phase converter 11, which now works in evaporation mode, water vapour is adsorbed again until discharging of water accumulator medium 3 is complete or adsorption of the water on water accumulator medium 3 and/or the formation reaction of magnesium hydroxide ceases.

In order to further increase the temperature of working fluid 2, another heat accumulator 16, which can be designed as a thermochemical heat accumulator, as a latent heat accumulator or as a sensible heat accumulator, can in turn be placed upstream and/or downstream from the heat accumulator 6 as the main heat accumulator of the heat accumulator system 1, if needed. The further heat accumulator 16 then works accordingly at a different temperature level than heat accumulator 6. As shown in FIG. 2, working fluid 2 can be preheated before flowing into heat accumulator 6 with the dry and warm auxiliary gas 8 if necessary, which is shown schematically by the dashed line 18 in FIG. 2.

The heat accumulator system 1 allow for accumulating the heat energy Q released during the discharging of heat accumulator medium 3 and making it available again later with almost no loss. The accumulator performance of the heat accumulator system 1 for heat energy Q is adjustable as required so that use in the area of remote heat use and/or for compressed air accumulator power plants is also possible. The accumulator capacity and the usable temperature ranges can be set through a corresponding selection of the accumulator medium 3. By using an auxiliary fluid 8 for the transport of volatilizable substance 15, an enrichment of volatilizable substance 15 in working fluid 2 is excluded. Moreover, the separation of working fluid 2 from heat accumulator medium 3 also avoids disturbance or impairment of the accumulability of heat accumulator medium 3 due to impurities in working fluid 2. Because of the conveyance of auxiliary fluid 8 in a closed cycle, a loss of heat Q during condensation of volatilizable substance 15 from auxiliary fluid 8 can be excluded almost completely, wherein the condensation heat Q can be interim-accumulated in heat accumulator 14 and reused for the later evaporation of volatilizable substance 15. This contributes to a high total efficiency of the heat accumulation with the described heat accumulation system 1.

The invention claimed is:

1. A method for heating and cooling a working fluid using at least one thermochemical heat accumulator medium, wherein, the working fluid is guided through at least one thermochemical heat accumulator comprising the heat accumulator medium, the working fluid being guided without contact to the heat accumulator medium, wherein upon charging of the heat accumulator medium a heat flow is transferred from the working fluid to the heat accumulator medium and at least one substance is released from the heat accumulator medium and conveyed away from the heat accumulator, and wherein upon discharging of the heat accumulator medium the substance is fed, releasing heat, to the heat accumulator medium or at least to a reaction product of the heat accumulator medium that was produced during charging of the heat accumulator medium, and a heat flow is transferred to the working fluid, wherein the charging of the heat accumulator medium is performed at a first pressure level by a compressor and the discharging of the heat accumulator medium is performed at a second pressure level by the compressor, the second pressure level being higher than the first pressure level, guiding an auxiliary fluid to the thermochemical heat accumulator medium, wherein flow direction of the auxiliary fluid during the switch between the charging of the heat accumulator medium and the discharging of the heat accumulator medium is inverted.

2. The method according to claim 1, characterized in that the substance discharged from the heat accumulator during the charging of the heat accumulator medium is accumulated and recycled to the heat accumulator for discharging of the heat accumulator medium.

3. The method according to claim 1, characterized in that auxiliary fluid is used for the transport of the substance out of the heat accumulator and to the heat accumulator, the auxiliary fluid flowing through the heat accumulator and at the same time being brought in contact with the heat accumulator medium and with the reaction product of the heat accumulator medium.

4. The method according to claim 3, characterized in that the auxiliary fluid is used for precooling the working fluid prior to the charging and for preheating the working fluid during discharging of the heat accumulator.

5. The method according to claim 1, characterized in that the auxiliary fluid is conveyed in a cycle that is materially separated from the flow path of the working fluid and that is closed, the substance transported during the charging of the heat accumulator medium through the auxiliary fluid being separated from the auxiliary fluid and accumulated for use during the discharging of the heat accumulator medium.

6. The method according to claim 1, characterized in that the substance released during the charging of the heat accumulator medium is separated from the auxiliary fluid through phase conversion and that the heat energy released during phase conversion is accumulated at least partially and is used for a new phase conversion of the substance for use of the substance during the discharging of the heat accumulator medium.

7. A heat accumulator adapted for carrying out a method according to claim 1, with a flow-through area for a working fluid and an accumulator area having at least one heat accumulator medium, the flow-through area being separated materially from the accumulator area so that the working fluid is guided without contact to the heat accumulator medium when flowing through, and the flow-through area and the accumulator area being interconnected such that a heat transfer is possible between the working fluid and the heat accumulator medium during charging and discharging of the heat accumulator medium.

8. The heat accumulator according to claim 7, characterized in that the accumulator area has a supply line and a drain line for the auxiliary fluid, wherein the accumulator area can be flowed through by the auxiliary fluid.

9. A heat accumulator system adapted for carrying out a method according to claim 1, with a heat accumulator according to claim 7, a compressor, a phase converter and, preferably, a pressure reducer, the heat accumulator, the compressor, the phase converter and, preferably, the pressure reducer being interconnected via a closed cycle duct for the auxiliary fluid.

10. The method according to claim 1, characterized in that a pressure level in the heat accumulator is adjusted to the reduced pressure level during the charging of the heat accumulator medium and to the higher pressure level during the discharging of the heat accumulator medium.

11. The method according to claim 1, characterized in that the at least one substance released from the heat accumulator medium is water and another substance, and that upon discharging of the heat accumulator medium the water and the another substance are fed to the heat accumulator medium.

12. The method according to claim 11, characterized in that the water is released from the accumulator medium through a desorption reaction and the another substance is released from the accumulator medium through a reversible chemical reaction, and that the water is fed to the accumulator medium through a sorption process and the another substance is fed to the accumulator medium through the reversible chemical reaction.

13. The method according to claim 1, characterized in that a second heat accumulator is positioned in line with the working fluid and upstream or downstream from the heat accumulator, and that the second heat accumulator works at a temperature level different than that of the heat accumulator.

* * * * *